(12) United States Patent
Yamaguchi et al.

(10) Patent No.: US 7,560,027 B2
(45) Date of Patent: Jul. 14, 2009

(54) METHOD FOR TREATING WASTEWATER AND SLUDGE

(75) Inventors: Toyoshi Yamaguchi, Kawasaki (JP);
Kunio Miyazawa, Sakura (JP); Yasuki Yao, Tokyo (JP); Toshiaki Tsubone, Tokyo (JP); Jun Miyata, Yokohama (JP); Yoshinori Yomura, Kawasaki (JP)

(73) Assignee: JFE Engineering Corporation, Tokyo (JP)

( * ) Notice: Subject to any disclaimer, the term of this patent is extended or adjusted under 35 U.S.C. 154(b) by 0 days.

(21) Appl. No.: 11/900,745

(22) Filed: Sep. 13, 2007

(65) Prior Publication Data

US 2008/0110825 A1 May 15, 2008

Related U.S. Application Data

(63) Continuation of application No. 11/393,511, filed on Mar. 30, 2006, now abandoned, which is a continuation of application No. 10/320,277, filed on Dec. 16, 2002, now abandoned.

(30) Foreign Application Priority Data

Jul. 3, 2002 (JP) ............................ 2002-195085
Oct. 28, 2002 (JP) ............................ 2002-312939

(51) Int. Cl.
*C02F 3/00* (2006.01)

(52) U.S. Cl. .................. 210/620; 210/621; 210/623; 210/630; 210/749

(58) Field of Classification Search .................. 210/620, 210/621, 623, 630, 749, 751
See application file for complete search history.

(56) References Cited

U.S. PATENT DOCUMENTS

| 4,208,282 A | 6/1980 | Becker |
| 4,473,590 A | 9/1984 | Weigandt et al. |
| 4,559,305 A | 12/1985 | Zajic et al. |
| 4,915,840 A | 4/1990 | Rozich |
| 4,945,939 A | 8/1990 | Maxwell et al. |
| 5,385,650 A | 1/1995 | Howarth et al. |
| 5,916,448 A | 6/1999 | Fergen |
| 6,083,395 A | 7/2000 | Katsura et al. |

(Continued)

FOREIGN PATENT DOCUMENTS

JP 9-253684 A 9/1997

(Continued)

*Primary Examiner*—Chester T Barry
(74) *Attorney, Agent, or Firm*—Frishauf, Holtz, Goodman & Chick, P.C.

(57) ABSTRACT

A method and an apparatus for treating organic wastewater and sludge which remarkably reduce the generated amount of sludge at a much lower running cost, and which reduce the size and the capacity of the solubilization tank. The method and apparatus for treating sludge employs a biological treatment system, wherein a biological treatment of wastewater is carried out, and a solid-liquid separation unit for separating a solid from a liquid in the wastewater after the biological treatment, to obtain a treated wastewater and a sludge. The apparatus has a means for obtaining a withdrawn sludge from a part of the sludge and an alkali-treatment tank, wherein an alkali-treatment of the withdrawn sludge is carried out. The apparatus also has a biological solubilization tank which solubilizes the sludge after the alkali-treatment under an anaerobic, anoxic or microaerophilic condition, and a means for recycling the solubilized sludge to the biological treatment system.

15 Claims, 8 Drawing Sheets

U.S. PATENT DOCUMENTS

| | | |
|---|---|---|
| 6,168,717 B1 | 1/2001 | Pressley et al. |
| 6,203,722 B1 | 3/2001 | Hurst |
| 6,660,163 B2 | 12/2003 | Miklos |
| 2002/0070179 A1 | 6/2002 | Pilz et al. |
| 2003/0168182 A1 | 9/2003 | Jonsson et al. |
| 2003/0217968 A1 | 11/2003 | Goel et al. |
| 2004/0152881 A1 | 8/2004 | Holtzapple et al. |
| 2005/0255216 A1 | 11/2005 | Savard et al. |

FOREIGN PATENT DOCUMENTS

| | | |
|---|---|---|
| JP | 2000-271598 A | 10/2000 |
| JP | 2001-347296 A | 12/2001 |

METHOD FOR TREATING WASTEWATER AND SLUDGE

CROSS-REFERENCE TO RELATED APPLICATION

This application is a continuation application of application Ser. No. 11/393,511 filed Mar. 30, 2006 (abandoned), which is a continuation of application Ser. No. 10/320,277 filed Dec. 16, 2002 (abandoned).

FIELD OF THE INVENTION

The present invention relates to a method for solubilizing sludge generated from a biological treatment process for organic wastewater and an apparatus thereof. Specifically, the present invention relates to a method and an apparatus for treating sludge, which suppresses the generation of excess sludge by solubilizing, in order to make it possible to reduce the generated amount of the sludge, and also relates to a method and an apparatus for treating wastewater thereof.

BACKGROUND OF THE INVENTION

From biological treatment processes such as an activated sludge process, a large amount of sludge is generated, wherein organic wastewater such as sewage needs to be dealt with. It is a serious problem how to treat and dispose of the sludge. Conventionally, the sludge has been dewatered through a dehydrator by adding a dewatering assistant, then disposed of in a landfill or by incineration. However, in the case of disposing of sludge as in a landfill, there occurs a problem of a significant increase in disposal cost, owing to the shortage of available landfill area. In the case of incinerating sludge, there occurs several problems, which are, overloading of the incinerator and how to dispose the ash after incineration. Accordingly, the above-mentioned problems result in difficulties.

An anaerobic digestion (methane fermentation) process is known to the world as one of a method for reducing the volume of sludge. The process, however, needs a long retention time so that the size and capacity of a tank becomes gigantic. In addition, the effect, which is given by reducing the sludge, is not so high, even in the gigantic tank. Above all, the digested sludge, which is left after the digestion treatment, cannot help dewatering, before disposal treatment.

Various processes have been presented to reduce the volume of sludge, up to now. For example, Japanese Patent Laid-Open No. H9-253684 discloses a process to reduce the volume of generated sludge by solubilizing the withdrawn sludge in the anaerobic fermentation step, followed by recycling the fermented withdrawn sludge to the activated sludge system. Furthermore, there is a proposed technology to reduce the volume of generated excess sludge, which is applied to the wastewater-treatment technology. This technology conducts the steps of: withdrawing a part of the returned sludge; applying an alkali-treatment to the withdrawn and returned sludge by adding an alkali; applying biological treatment to the alkali-treated sludge under an anaerobic, anoxic, or microaerophilic condition; and recycling the biologically-treated sludge to the biological treatment step such as an aeration tank.

According to these conventional technologies, however, solubilizing the sludge merely by the anaerobic fermentation treatment needs a long retention time for attaining a sufficient solubilized ratio, which inevitably increases the size of the solubilization tank. For example, in the case that enzymes produced by thermophilic aerobic bacteria solubilize the sludge, the running cost increases, which is the heating cost and the running cost for running the aeration in order to maintain the aerobic condition.

As for the solubilization of sludge by ozone oxidation, foaming trouble in the ozone oxidation tank may occur, and a treatment system for emitting ozone is required. Furthermore, the investment cost to install an ozonizer and the running cost to add ozone is high. So, the initial investment cost increases to a great degree simultaneously with an increasing running cost. With regard to the solubilization by a hot-alkali-treatment process, a large amount of chemicals are required, which causes a cost-increase for the chemicals and the heating. This results in increasing the running cost.

As mentioned above, without applying a large scale of the solubilization tank and with the low running cost, no conventional technologies can achieve the volume reduction of sludge.

SUMMARY OF THE INVENTION

In order to solve the above-described problems, the present invention provides the methods and apparatuses, as follows.

First, a method for treating a sludge comprising the steps of:
treating a wastewater biologically to generate a sludge;
treating the sludge by an alkali-treatment; and
solubilizing the alkali-treated sludge biologically, under an anaerobic, an anoxic, or a microaerophilic condition.

Second, a method for treating a wastewater comprising the steps of:
treating a wastewater biologically;
separating a solid from a liquid in the wastewater treated biologically, to obtain a treated wastewater and a returned sludge;
withdrawing the sludge from a part of the returned sludge to obtain a withdrawn sludge; and treating the withdrawn sludge by an alkali-treatment; and
solubilizing and decomposing the withdrawn sludge, biologically, under an anaerobic, anoxic, or a microaerophilic condition.

(Note: In the above-mentioned description, there exists an expression of 'treating a wastewater biologically'. In this expression, a wastewater means flowing into a method and an apparatus of the present invention, and then, the wastewater is dealt with (treated) in the method and the apparatus. There, also, exists an expression of 'to obtain a treated wastewater'. In this expression, 'a treated wastewater' mainly means the wastewater after having been dealt with (having been treated with) in the method and the apparatus of the present invention. In the specification, there are found the expressions of 'a treated wastewater', or 'the quality of the treated wastewater'. These are mainly defined as 'after having treated in the method and the apparatus for treating the sludge and the wastewater of the present invention.)

Third, an apparatus for treating a sludge comprising:
an alkali-treatment tank for treating a sludge by an alkali-treatment, generated in the biologically treated wastewater; and
a biological solubilization tank, located at downstream side of the alkali-treatment tank, connected with the alkali-treatment tank via a passage, to biologically solubilize the sludge after treating the sludge by the alkali-treatment under an anaerobic, an anoxic, or a microaerophilic condition.

Fourth, an apparatus for treating a wastewater comprising:
a biological treatment system to treat a wastewater biologically;
a solid-liquid separation unit, located at downstream side of the biological treatment system, connected with the biological treatment system via a passage, to separate the biologically treated wastewater in the biological treatment system and to obtain the treated wastewater and the returned sludge.
means for obtaining a withdrawn sludge from a part of the returned sludge;
an alkali-treatment tank to treat the withdrawn sludge by the alkali-treatment;
a biological solubilization tank to biologically solubilize the sludge after treating the sludge by the alkali-treatment, under an anaerobic, an anoxic, or a microaerophilic condition; and
a sludge returning passage for recycling the solubilized sludge into the biological treatment system.

Fifth, a method for treating a sludge comprising the steps of:
treating a wastewater biologically to generate the sludge; and
treating the sludge by an alkali-treatment, by intermittently adding the alkali to the sludge at a determined interval.

Six, an apparatus for treating a sludge comprising:
an alkali-treatment tank for intermittently adding the alkali at a determined interval to the sludge generated by treating a wastewater biologically, and for treating the sludge by the alkali-treatment with holding a retention time of from for 3 hours to for 24 hours;
a biological solubilization tank for solubilizing biologically the treated sludge by the alkali, at a normal temperature and a pressure in an anaerobic, anoxic, or microaerophilic condition, with the retention time of from for 1 day to for 3 days, wherein the biological solubilization tank being located at downstream side of the alkali-treatment tank and being connected with the alkali-treatment tank via a passage; and
means for transporting at least apart of the alkali-treated sludge into the biological solubilization tank.

Seventh, a method for treating a wastewater comprising:
treating a wastewater biologically in a biological treatment system;
separating a solid from a liquid after treating the wastewater biologically, to obtain a treated wastewater and a returned sludge, and to obtain a withdrawn sludge from a part of the returned sludge;
treating the withdrawn sludge by intermittently adding alkali at a determined interval, with holding a retention time after adding the alkali from for 3 hours to for 24 hours;
solubilizing the alkali-treated sludge biologically at a normal temperature and a pressure in an anaerobic, anoxic, or microaerophilic atmosphere, with holding a retention time after adding alkali from for 1 day to 3 days; and
returning the solubilized sludge to the biological treatment system.

Eighth, an apparatus for treating a wastewater comprising:
means for treating a wastewater biologically in a biological treatment system;
means for separating a solid from a liquid in the biologically treated wastewater, to obtain a treated wastewater and a returned sludge;
means for obtaining a withdrawn sludge from a part of the returned sludge;
means for treating the withdrawn sludge by intermittently adding an alkali at a determined interval, with holding a retention time after adding the alkali from for 3 hours to for 24 hours;
means for solubilizing the treated sludge by the alkali-treatment biologically solubilization treatment to the sludge after treating the alkali-treatment at a normal temperature and a pressure in an anaerobic, anoxic, or microaerophilic atmosphere, with holding a retention time after adding alkali from for 1 day to 3 days; and
means for returning the solubilized sludge to the biological treatment system.

Ninth, a method for treating a wastewater comprising the steps of:
treating a wastewater biologically;
separating a solid from a liquid in the biologically treated wastewater to obtain a treated wastewater and a returned sludge;
treating a part of the return sludge by an alkali-treatment, within a range of pH value from 9 to 12.5;
solubilizing the sludge biologically immediately after treating the sludge by the alkali, in an anaerobic, anoxic, or microaerophilic condition; and
returning the solubilized sludge to the biological treatment system.

Tenth, an apparatus for treating a wastewater comprising:
a biological treatment tank to treat a wastewater biologically;
a solid-liquid separation unit to separate the wastewater discharged from the biological treatment tank to obtain a treated wastewater and a returned sludge;
an alkali-treatment tank to treat a part of the returned sludge by the alkali within a range of pH value from 9 to 12.5;
a biological solubilization tank, connected to the alkali-treatment tank, to biologically solubilize the sludge discharged from the alkali-treatment tank under an anaerobic, anoxic, or microaerophilic condition; and
means for returning the sludge discharged from the biological solubilization tank to the biological treatment tank, to recycle the sludge.

DETAILED DESCRIPTION OF THE INVENTION

Embodiment 1

Figure 1:
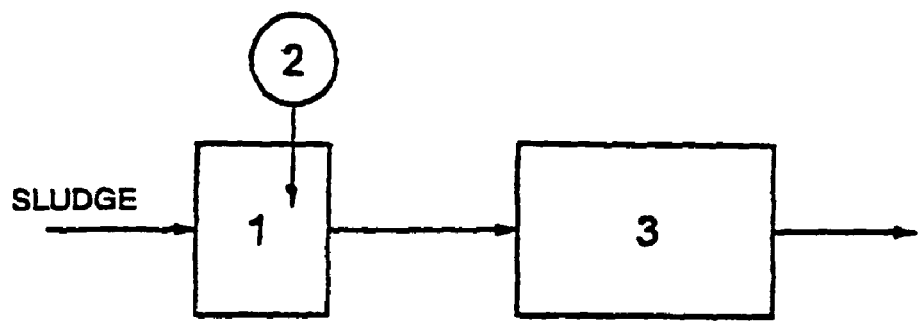
FIG. 1 shows an example of the Embodiment 1 according to the present invention.

The method and the apparatus for treating a sludge, and the method, the apparatus for treating organic wastewater, and those for utilizing hereof according to the Embodiment 1, are described below, referring to the drawings.

FIG. 1 shows one example of a device for solubilizing sludge, according the Embodiment 1.

According to the treatment device given in the drawing, the sludge is introduced into an alkali-treatment tank 1. Inside of the alkali-treatment tank 1, the sludge is treated by alkali by way of adding a slight amount of alkali 2, while the sludge being held for a predetermined period. Through the alkali-treatment, a various kinds of components, which are constituted as one of the microorganism's cells, to generate the sludge, are improved to be various structures that are easily biologically decomposed.

Examples of alkali, which are added to conduct the alkali-treatment, are sodium hydroxide, potassium hydroxide, calcium hydroxide, magnesium hydroxide, sodium carbonate, and sodium hydrogencarbonate. However, the applicable alkali is not limited to those examples.

The necessary additive amount of alkali depends on, respectively, which means, the kind, the concentration, the condition, the state, and the like of the sludge. According to the Embodiment 1, the sludge after treated by alkali is biologically solubilized in a later stage. Accordingly, compared with solubilizing sludge solely by alkali-treatment, the Embodiment 1 consumes less amount of alkali. In that case, the pH within the alkali-treatment tank 1 may be less than a pH of 9, and a higher pH is not required. Nevertheless, for solubilizing efficiently, a pH value of 7 or higher is preferable, and a pH value of 8 or higher is more preferable. Therefore, according to the Embodiment 1, the pH in the alkali-treatment tank 1 is preferably within a range from 8 or more to 9 or less. By this way, the Embodiment 1 can invite cost reduction of chemicals, compared with the conventional alkali-treatment methods, which are conducted at a high range of the pH value.

The alkali-treatment is preferably carried out at normal temperature. Heating is not always necessary for the alkali-treatment. Embodiment 1 shows that the alkali-treatment at normal temperature attains a satisfactory effect to need no heating cost. The alkali-treatment tank 1 may be complete mixing type or plug-flow type. Particularly, in case of adopting the plug-flow type, it can be attained that reducing the amount of alkali reduces the further amount of cost. In addition, it can be attained that the size of tank is got to be smaller by the reason of shortening the retention time. So, the plug-flow type is preferable and expected to bring more efficient treatment. After being treated by alkali, the sludge is introduced into a biological solubilization tank 3, where further solubilized process goes on by the sludge solubilized bacteria's action. The process is achieved under an anaerobic, anoxic, or microaerophilic condition.

With regard to the sludge after being treated by alkali, there is a possibility that the alkali-solubilizable components become sludge again, when they are exposed to an aerobic environment. In order to avoid the phenomenon, it is preferable that the sludge treated by alkali is introduced into the biological solubilization tank 3, without getting touch with the air.

Solublizating the sludge in the biological solubilization tank 3 is described in detail, as follows.

As one of microorganisms influencing on solubilizing the sludge in the biological solubilization tank 3, the following microorganisms are preferable. That's to say, there are preferable microorganisms, which secrete protease and amylase for decomposing proteins and carbohydrates, (Note: the proteins and the carbohydrates are major components of the sludge.), under the condition of the normal temperature and pressure, an anaerobic, an anoxic, or a microaerophilic environment. Additionally speaking, they can utilize the component of the sludge as nutrients. However, the microorganisms are not specifically limited to those given above.

The sludge is treated by alkali on a preliminary treatment stage. As the result of it, there occur the destruction of bacterial cells and the elution of intracellular fluid. The solubilizing rate in the biological solubilization tank 3 enormously increases compared with the conventional processes. Owing to the increased solubilizing rate, the retention time in the solubilization tank can be held to be shorter. And, by that reason, it can be attained to get the capacity of the biological solubilization tank 3 to be smaller.

As described above, according to the Embodiment 1, solubilizing the sludge is performed in the biological solubilization tank 3, under an anaerobic, anoxic, or microaerophilic condition. Consequently, no aeration is needed. Therefore, there is nothing special for the additional device to treat the sludge. However, in order to increase the reactivity of the sludge, a simple agitator may be installed. Even in case of installing the agitator, the installation cost can be reduced, compared with the installation cost for the aerator. Furthermore, according to the Embodiment 1, the satisfactory effect is attained, even at the normal temperature, so that no heating is required. Accordingly, compared with the conventional processes, the Embodiment 1 can provide a much simpler and lower running cost process.

The alkaline liquid is treated in the solubilization tank 3 under an anaerobic, anoxic, or microaerophilic condition. Afterwards, the alkaline liquid, which has been introduced into the biological solubilization tank 3 from the alkali-treatment tank 1, is neutralized to the neighborhood at the neutral of pH value. Consequently, the Embodiment 1 needs no acid or the like to neutralize the treated liquid and it needs no chemicals cost for neutralization.

The biological solubilization tank 3 may be the complete mixing type. However, the plug-flow type can create a pH gradient inside of the solubilization tank. Since the sludge, which has been introduced immediately into the solubilization tank, keeps a high pH, the further efficient solubilization can be expected and the further low chemicals cost can be attained.

The method and the apparatus for treating organic sludge utilizing the above-described solubilizing sludge process according to the Embodiment 1 are explained in more detail, in accordance with the drawing.

Figure 2:
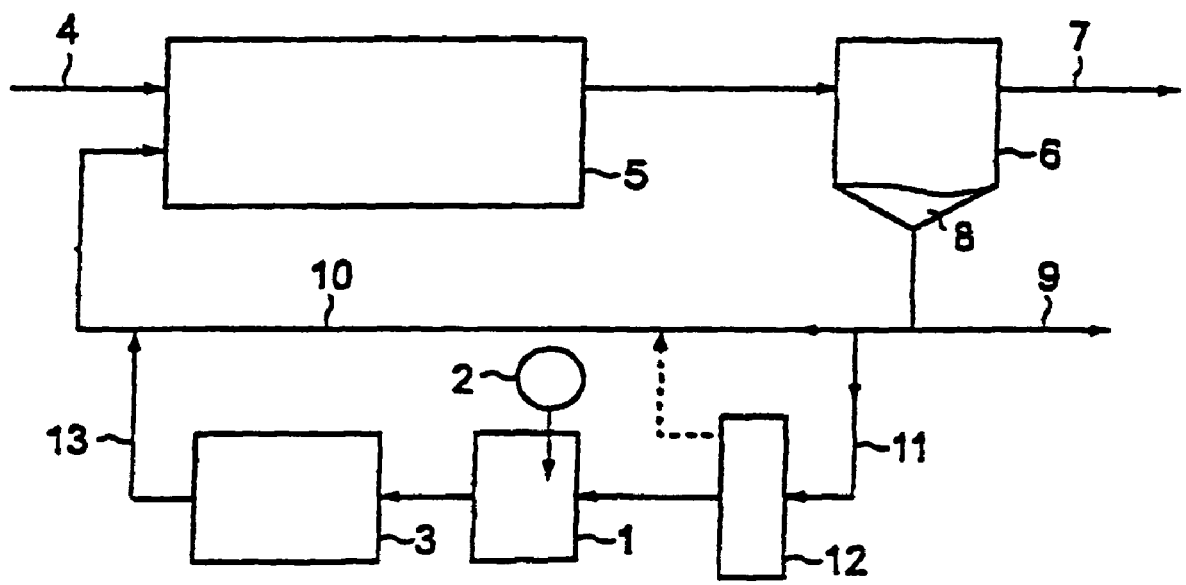
FIG. 2 shows another example of the Embodiment 1 according to the present invention.

FIG. 2 shows an example of organic sludge treatment device, according to the Embodiment 1.

In the treatment device shown in FIG. 2, organic wastewater 4 is introduced into a biological treatment tank 5, where the wastewater 4 is subjected to biological treatment for a predetermined period. After that, the wastewater 4 is introduced into a precipitating tank 6, where the sludge is separated to obtain a clear treated wastewater 7. The biological treatment process may be activated sludge process, rotary biological contact process, watering biofilter-bed process, submerged biofilter-bed process. However, the biological treatment process is not limited to the above-given ones.

Most part of the precipitated sludge 8 after the solid-liquid separation treatment is recycled to the biological treatment tank 5 from sludge returned line 10. On the other hand, sludge 11 withdrawn from the sludge returned line 10 is introduced into a sludge thickening device 12, where the sludge 11 is concentrated to a predetermined concentration, then the sludge 11 is introduced into the above-described sludge solubilization device.

Sludge 13, which is treated to be solubilized in the sludge solubilization device, is returned to the returned line 10 to recycle to the biological treatment tank 5 for achieving again the biological treatment. As a result, the organic in the sludge which has been solubilized, are removed by aerobic biological decomposition in the biological treatment tank 5. Consequently, the discharged amounts of the excess sludge 9 decreases remarkably.

As shown in the treatment device given in the Figure, before the withdrawn sludge 11 is introduced into the alkali-treatment tank 1, it is preferred that the withdrawn sludge 11 has been concentrated by a concentrator 12 such as a centrifugal separator, in order to reduce the amount of the liquid. Such a preliminary treatment brings out the reduction of the amount of alkali for maintaining the pH in the alkali-treatment tank 1, to a certain degree. And, the alkali cost is further reduced. Reducing the total amount of the treated sludge makes it possible to get the size of the alkali-treatment tank 1 to be smaller and the size of the biological solubilization tank 3, to the further smaller.

EXAMPLES

The Embodiment 1 is further described in more detail, showing the concrete examples, as follows. However, the Embodiment 1, is not limited to this example.

Example 1

Excess sludge, which had been extracted from a sewage treatment plant, was deaerated by nitrogen. And then, the excess sludge treated in this way, was transported and packed into a sealed container. In the container, enriching the culture of microorganisms was achieved, making use of the microorganism's ability, which is the ability to decompose the sludge under an anaerobic, anoxic, or microaerophilic condition.

The enriched cultural liquid, which had been obtained in the above-mentioned way, was analyzed in a sterilized sludge supernatant culture medium, in order to determine the power for decomposing the sludge. As the result of it, the solubilized bacteria in the sludge were obtained. The above-mentioned treatment was achieved at the normal temperature and the pressure, under an anaerobic condition.

As the next step, the excess sludge was adjusted to contain approximately 10 g/L of MLSS (activated sludge concentration). Sodium hydroxide as the alkali was added to the sludge, where the alkali-treatment was achieved by mixing and agitating for one day. After treating the sludge, the pH value of the sludge was approximately 8.5.

Afterwards, the 20 ml of sludge obtained by the alkali-treatment and the 20 ml of pure cultured fluid of the above-described sludge solubilized bacteria were mixed together. The mixture was poured into the flask with baffle, whose capacity is 50 ml. After filling the upper space in the flask with nitrogen, the flask was sealed. And, the contents were treated by shaking them at 20° C., 100 rpm and for 3 days. After treating in such a way, MLSS of the mixture was measured and the percentage of the solubilized amount was derived and determined, in comparison with the initial MLSS.

As one of the Comparative Example, the sludge, which was adjusted to approximately 10 g/L of MLSS, was agitated for one day, without adding alkali. Instead of the pure cultured fluid of solubilized bacteria in the sludge, 20 ml of sterilized medium for culturing solubilized bacteria was used to mix with 20 ml of the alkali-treated sludge. Except the Comparative Example as mentioned above, solubilizing the sludge was achieved as the same procedure with the other mentioned example as mentioned above.

The percentage of the solubilized sludge in the Example 1 and in the Comparative Example is given in Table 1, along with the treatment conditions.

TABLE 1

| | Treatment condition | Solubilized percentage (%) |
|---|---|---|
| Example | Alkali-treatment + Solubilized bacteria adding treatment for sludge | 34 |
| Comparative Example | Without adding alkali and sludge solubilized bacteria | 8 |

As shown in Table 1, the Embodiment 1, which treats by way of adding alkali and sludge solubilized bacteria, the following result was attained. That's to say, it is the high solubilized percentage, which means, more than four times that of the Comparative Example, within a relatively short treatment period. To the contrary, the Comparative Example, which did not add alkali and sludge solubilized bacteria, did not solubilize almost of the sludge within a short period such as 4-day treatment.

Example 2

Figure 3:
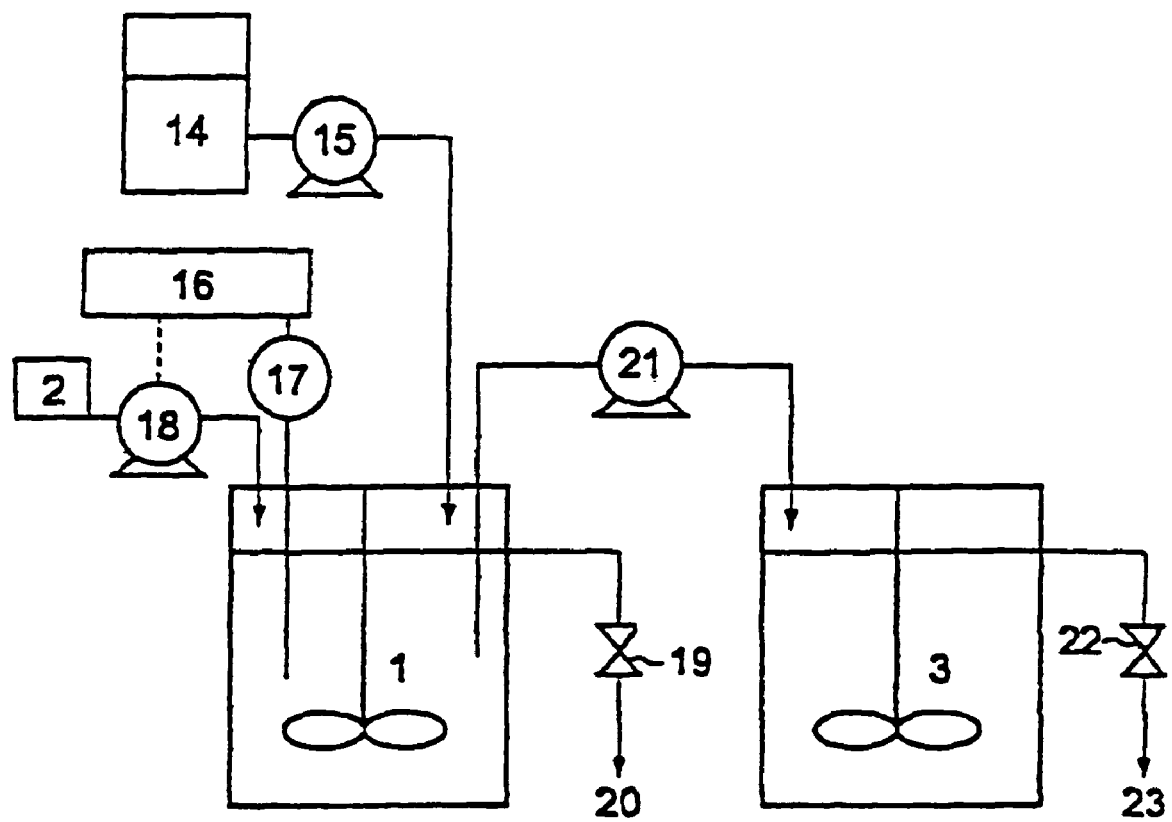
FIG. 3 shows an example of continuous testing according to the Embodiment 1 of the present invention.

Concerning the excess sludge, a continuous treatment testing according to the Embodiment 1 was achieved. FIG. 3 shows the system configuration of the device, which was used in the Example 2.

In FIG. 2, the sludge solubilization device has a cylindrical alkali-treatment tank 1, whose capacity is 400 ml. In addition, a biological solubilization tank 3 has the same shape and the same capacity with those of the alkali-treatment tank 1. Merely the mechanical agitation was achieved, without aeration under the condition of the normal temperature and pressure, while both of treatment tanks were kept in sealed state. As the testing piece of the sludge, excess sludge 14 was used, which was extracted from a sewage treatment plant, and which was adjusted to approximately 10 g/L of MLSS, to be stored at 4° C. The sludge was successively supplied into the alkali-treatment tank 1, by operating a sludge transfer pump 15, at a regular interval, for keeping the retention time of 6 hours.

The pH value in the alkali-treatment tank 1 was controlled at 8.5, by using sodium hydroxide 2, and by using a pH controller 16. A part of the treated sludge in the alkali-treatment-tank 1, was withdrawn by a sludge transfer pump 21, and was fed into the biological solubilization tank 3, while the rested sludge was overflowed to be discharged. In comparison with the MLSS of the overflowed sludge 20 and the MLSS of tested sludge 14, the percentage of the solubilized sludge in the alkali-treatment tank 1 was derived.

There was no chance to adjust pH in the biological solubilization tank 3. The operation was carried out, determining the retention time of 3 days. The 5-ml of concentrated cultured fluid, which contained the sludge solubilized bacteria, was added to the biological solubilization tank 3. The cultured fluid had previously been was prepared in Example 1 at the beginning stage of the experiment. Concerning the biological solubilization tank 3, the similar treatment with the alkali-treatment tank was proceeded, which was, overflowing the sludge to keep the liquid level.

The MLSS of the effluent sludge 23 was compared with the MLSS of the effluent sludge 20 of the alkali-treatment tank to derive the percentage of the solubilized sludge in the biological solubilization tank. In comparison with the MLSS of sludge 23 and the MLSS of testing sludge 23, the percentage of the solubilized sludge for the total system was determined.

An experiment as the Comparative Example 1 was given with the similar system mentioned above, except that the pH value in the alkali-treatment tank 1 was set to 7, and except that the biological solubilization tank 3 did not receive sludge solubilized bacteria. Similar experiment as the Comparative Example 2 was given, while setting the pH value in the alkali-treatment tank 1 to be value 7, and adding the sludge solubilized bacteria into the biological solubilization tank 3.

The obtained results are summarized in Table 2.

TABLE 2

|  | Example | Comparative Example 1 | Comparative Example 2 |
|---|---|---|---|
| The pH set level in alkali-treatment tank | 8.5 | 7 | 7 |
| Addition of sludge solubilized bacteria into biological solubilization tank | Added | Not added | Added |
| Sludge solubilization percentage in alkali-treatment tank (%) | 15.1 | 3.8 | 3.5 |
| Sludge solubilization percentage in biological solubilization tank (%) | 19.2 | 5.3 | 8.1 |
| Sludge solubilization percentage of total system (%) | 34.3 | 9.1 | 11.6 |

As shown in Table 2, the Embodiment 1, which applies the alkali-treatment and the biological treatment by sludge solubilized bacteria, attained that the percentage of solubilization is around four times the percentage of the Comparative Example 1 without being treated. When the Example is compared with the Comparative Example 2, the biological solubilization tank showed in the Example attained two times or more the percentage of solubilization than that showed in the Comparative Example 2. But, in both cases, the sludge-solubilized bacteria are applied to be added. Since the Embodiment 1 applied preliminarily the alkali-treatment, the sludge was presumably improved to be characteristics, which is easy to be decomposed by the enzymes of the sludge solubilized bacteria.

Example 3

Making use of sewage, a treatment testing was achieved by the following procedure. Looking into in detail, the Embodiment 1 and the conventional technology were compared with each other. In the embodiment, it made it a rule that the activated sludge process operated the biological treatment tank 5.

Method A: The treatment was achieved by the Embodiment 1 shown in FIG. 2.

Figure 4:
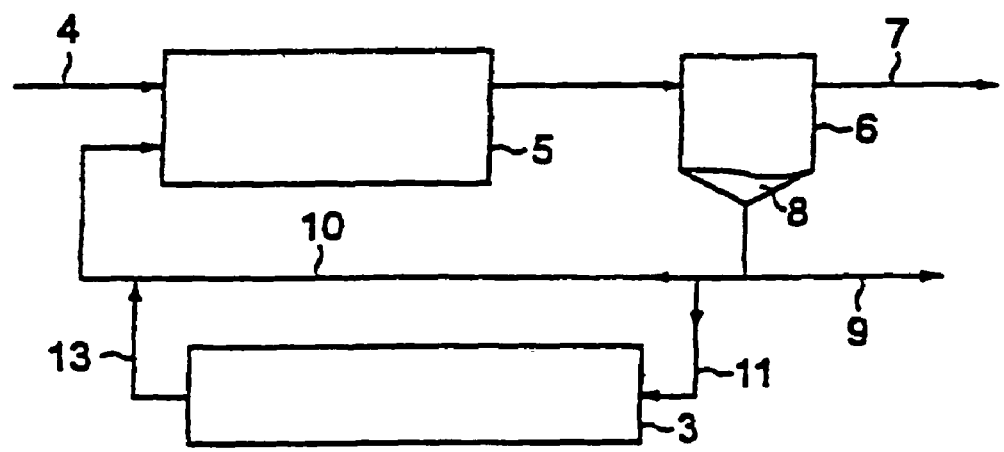
FIG. 4 shows an example of solubilized sludge solely by the anaerobic fermentation treatment according to the Embodiment 1 of the present invention.

Method B: The treatment was achieved by the sludge solubilization solely, by the anaerobic fermentation treatment shown in FIG. 4. The device shown in FIG. 4 is the same with that of FIG. 2. Different is that the sludge solubilization device consisting of the sludge thickening device 12, the alkali-treatment tank 1, and the biological solubilization tank 3 is replaced merely with biological solubilization tank 3 for treating by anaerobic fermentation.

Figure 5:
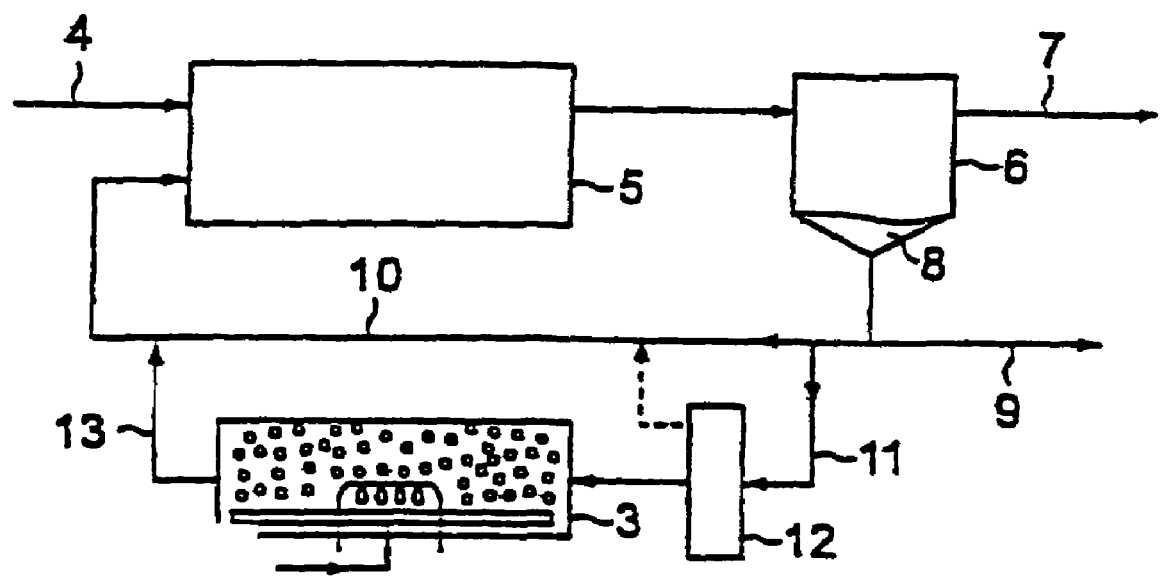
FIG. 5 shows an example of solubilized sludge by enzymes produced by thermophilic aerobic bacteria according to the Embodiment 1 of the present invention.

Method C: The treatment was achieved by the sludge solubilization process, shown in FIG. 5, using enzymes produced from the thermophilic aerobic bacteria. The device shown in FIG. 5 is the same with FIG. 2. Different points from FIG. 2 are that the alkali-treatment tank 1 was eliminated, that an aerator, which maintains the aerobic condition in the biological solubilization tank 3 are added, and that a heating means to establish a high temperature state were added.

Figure 6:
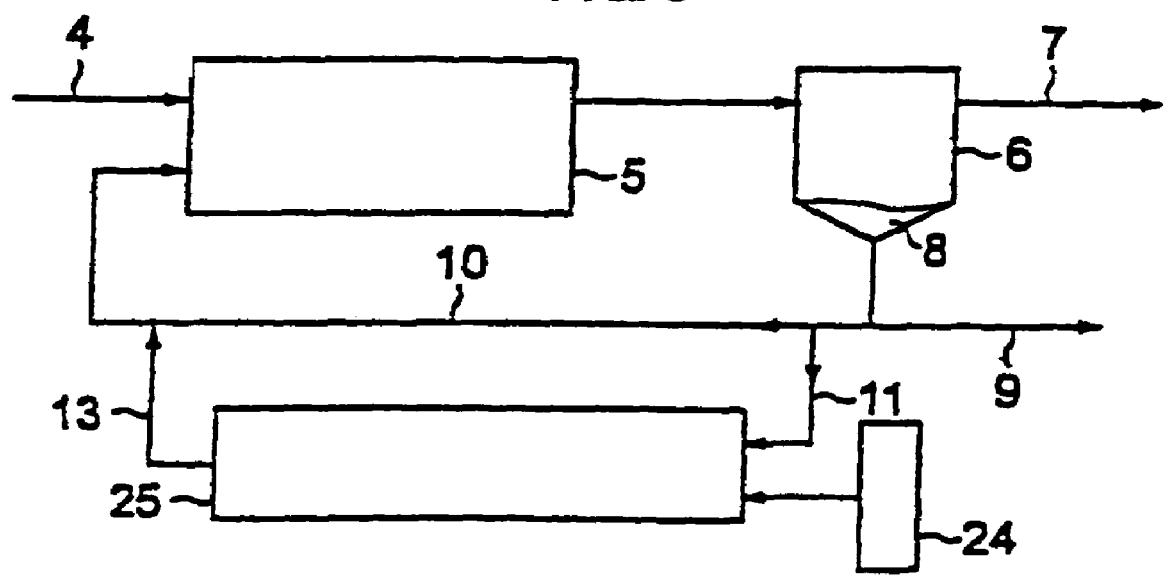
FIG. 6 shows an example of solubilized sludge by ozone oxidation according to the Embodiment 1 of the present invention.

Method D: The treatment was achieved by the sludge solubilization process by ozone oxidation, shown in FIG. 6. The device shown in FIG. 6 is as the same as that of FIG. 2. Different configuration is that the sludge solubilization device, which consists of the sludge thickening device 12, the alkali-treatment tank 1 and the biological solubilization tank 3, is replaced with an ozonizer 24 and an ozone treatment tank 25.

Figure 7:
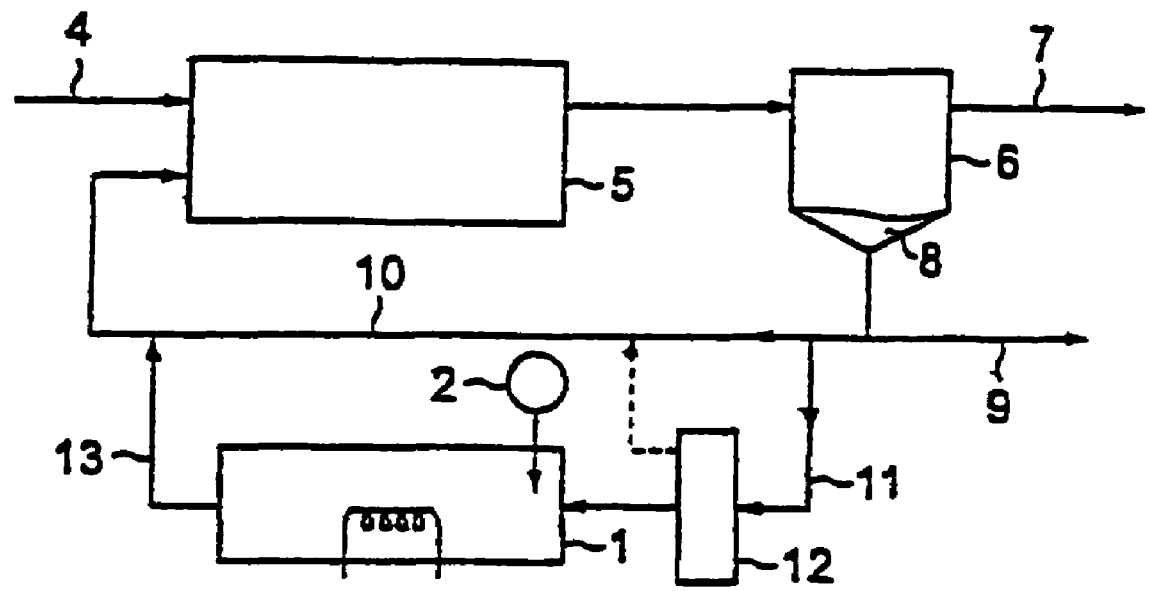
FIG. 7 shows an example of solubilized sludge by hot-alkali-treatment according to the Embodiment 1 of the present invention.

Method E: The treatment was achieved by the solubilization by hot-alkali-treatment. The device shown in FIG. 7 is the same with that of FIG. 2, except that the biological solubilization tank 3 was eliminated and except that the heating means was added into the alkali-treatment tank 1.

Figure 8:
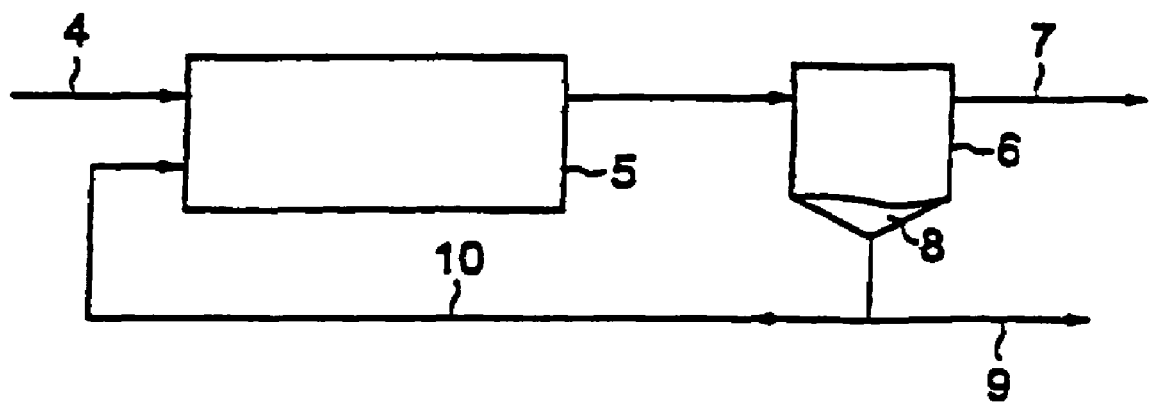
FIG. 8 shows an example of a conventional process.

Method F: The treatment was achieved by the conventional process shown in FIG. 8. The device shown in FIG. 8 is the same with that of FIG. 2, except that the sludge solubilization step is not applied.

Table 3 shows the quality of sewage tested. The testing was carried out at a throughput of 120 L/d, in any of the method.

TABLE 3

| Water temperature | 20-25° C. |
|---|---|
| SS | 90-110 mg/L |
| BOD | 120-135 mg/L |

Table 4 shows the results. Additionally speaking, the initial cost, the running cost, and the capacity of the solubilization tank are compared with mutually on the basis of the Embodiment 1 (Method A) as unity.

The quality of generated sludge was compared with, on the basis of the conventional method as unity.

TABLE 4

|  | A | B | C | D | E | F |
|---|---|---|---|---|---|---|
| Initial cost | 1 | 0.9 | 1.4 | 2.4 | 0.85 | 0 |
| Running cost | 1 | 0.9 | 1.8 | 2.2 | 3 | 3.1 |
| Solubilization tank capacity | 1 | 4.0 | 1.3 | 0.9 | 0.03 | — |
| Generated sludge | 0 | 0.5 | 0 | 0 | 0.3 | 1 |

As shown in Table 4, the Embodiment 1 process makes it possible to operate the treatment system at much lower running cost with a small capacity of solubilization tank, and without generating excess sludge.

As described above, the Embodiment 1 reduces the capacity of solubilization tank, and provides a sludge treatment method, which can efficiently solubilize the sludge at low running cost, and an organic wastewater treatment method, which can significantly reduce the generated sludge by making use of the sludge treatment method. Furthermore, the Embodiment 1 can significantly reduce the generated sludge at low running cost, and provides a sludge treatment apparatus for minimizing the solubilization tank capacity, and an organic wastewater treatment apparatus, which can reduce the generated sludge remarkably, by making use of the sludge treatment apparatus.

The Embodiment 1 makes it possible to solubilize efficiently the sludge without applying complex operation and facilities. Consequently, it becomes available that treating period is shorter and that the accompanied solubilization device is got to be smaller size.

Furthermore, by applying the sludge solubilization treatment using microorganisms, the chemicals cost for alkali-treatment reduces, and no chemical agent for neutralization is required to reduce the cost. The alkali-treatment is satisfactorily done at the normal temperature, so that no heating cost is necessary.

Furthermore, solubilized decomposing the sludge biologically is carried out at the normal temperature and pressure under an anaerobic, anoxic, or microaerophilic condition. No heating and aeration are necessary. Thus, the operation can be done at the lower running cost. Recycling thus solubilized sludge into the biological treatment system brings up that the generated excess sludge are decreased to a big deal, which invites reducing the number of the conventional sludge dewatering step and the sludge incineration step. So, in some case, such steps are not required.

The Embodiment 1 is extremely effective in treating the sludge generated from biological treatment process of organic wastewater such as sewage. The value for the industrial use is very high.

Embodiment 2

The Embodiment 2 is described in detail, as follows.

The term "solubilizing sludge" in the specification defines a general concept, which includes, various substances in the sludge to the substances of low molecular weight, which converts organic substances to inorganic substances, which destructs bacterial cells, and which elutes intracellular fluid, and the like.

According to the sludge treatment process of Embodiment 2, the sludge is solubilized and improved to be a different quality, by adding intermittently an alkali at a predetermined interval.

In the conventional processes, a method using pH control is used as one of the regular alkali-treatment. From this point of view, the inventors of the present invention have found out that the treatment capacity is different and the treatment capacity depends on the concentration of the treated sludge. That's to say, in accordance with decreasing the activated sludge concentration (MLSS), the consumption of chemicals, which is used to cancel the buffer action of the sludge, increases, compared with the consumed amount of chemicals used to solubilize the sludge. As a result of it, even when the added amount of chemicals per unit dry sludge is the same one, the lower concentration of the activated sludge cannot solubilize and improve the sludge to a satisfactory degree.

Judging from the above stand point of view, the Embodiment 2 tried and attained to solve the above-mentioned problems, by way of adding a predetermined amount of alkali intermittently at a predetermined interval. The way is independent of pH value, without keeping the continuous control of pH. Immediately after adding alkali, the pH value in the alkali-treatment tank becomes very high. Thus, the consumed amount of alkali for canceling the buffer action reduces, which results in consuming the alkali efficiently to enhance solubilizing and improving the sludge. Afterwards, adding alkali is not taken place for a certain period, until adding alkali is taken place on the next time. Consequently, the pH value in the alkali-treatment-tank decreases, and the solubilized percentage also decreases. However, totally, in case of being compared with the continuous control of pH value, using the same consumed amount of alkali, the effect, which is invited by the solubilized sludge and by the improved sludge, drastically increases.

A preferred range of activated sludge concentration (MLSS) of the sludge, which is subjected to the solubilization treatment according to the Embodiment 2, is 60 g/L or less and more preferably from 20 to 1 g/L.

Preferably, the range of interval for adding alkali is fallen within from 0.5 to 48 hours. If the interval for adding alkali is less than 0.5 hour, the advantageous effect cannot be obtained, compared with the continuous control method. Contrarily, if the interval for adding alkali exceeds 48 hours, the added amount per once becomes excessive, and in spite that solubilization is saturated by alkali, there increases a useless consumption of alkali. Consequently, the intervals for adding alkali are preferably from fallen within the range from 0.5 to 48 hours, more preferably fallen within the range from 8 to 36 hours, and the most preferably fallen within the range from 12 to 24 hours.

As examples of alkali for adding the alkali-treatment process, are sodium hydroxide, potassium hydroxide, calcium hydroxide, magnesium hydroxide, sodium carbonate, and sodium hydrogencarbonate. However, the adequate alkali is not limited to those examples.

The required and added amount of alkali per once is determined to be an appropriate one, depending on the kind, the concentration, the condition, and the like, of the applicable sludge. According to the Embodiment, which means substitution method, the sludge after having been treated by alkali is biologically solubilized on a later stage. By that reason, compared with the case of solubilizing the sludge just by alkali-treatment, it makes it possible to suppress the consumed amount of alkali, to less degree.

The alkali-treatment may be achieved under the heated environment or pressurized environment. However, the alkali-treatment attains the satisfactory result, even under the condition of the normal temperature and pressure. In this case, there is required no cost for heating and pressurization. The term "normal temperature" referred herein is defined to be fallen within the temperature range from 5° C. to 35° C., preferably from 15° C. to 30° C. The term "normal pressure" referred herein is defined to be the atmospheric pressure.

According to the Embodiment, the alkali-treatments tank, where the alkali-treatment is carried out by irregular operation. So, the characteristic of the effluent sludge, which is flowed out from the alkali-treatment tank, varies, depending on the passing time. Nevertheless, the characteristics of the sludge at the exit of the biological solubilization tank, which is the exit of the final solubilization system, can be kept to be a definite one, regardless of the passing time. Because, on a succeeding stage, the sludge after the alkali-treatment is treated to be solubilized in the biological solubilization tank, where it takes a long retention time of the sludge. From time to time, when the sludge, which has been solubilized biologically by alkali-treatment, the variation of the sludge has a possibility to influence on the waste disposal facility to get worse. But, by the above-mentioned way in the sludge treatment method, such an anxiety can be removed.

Figure 9:
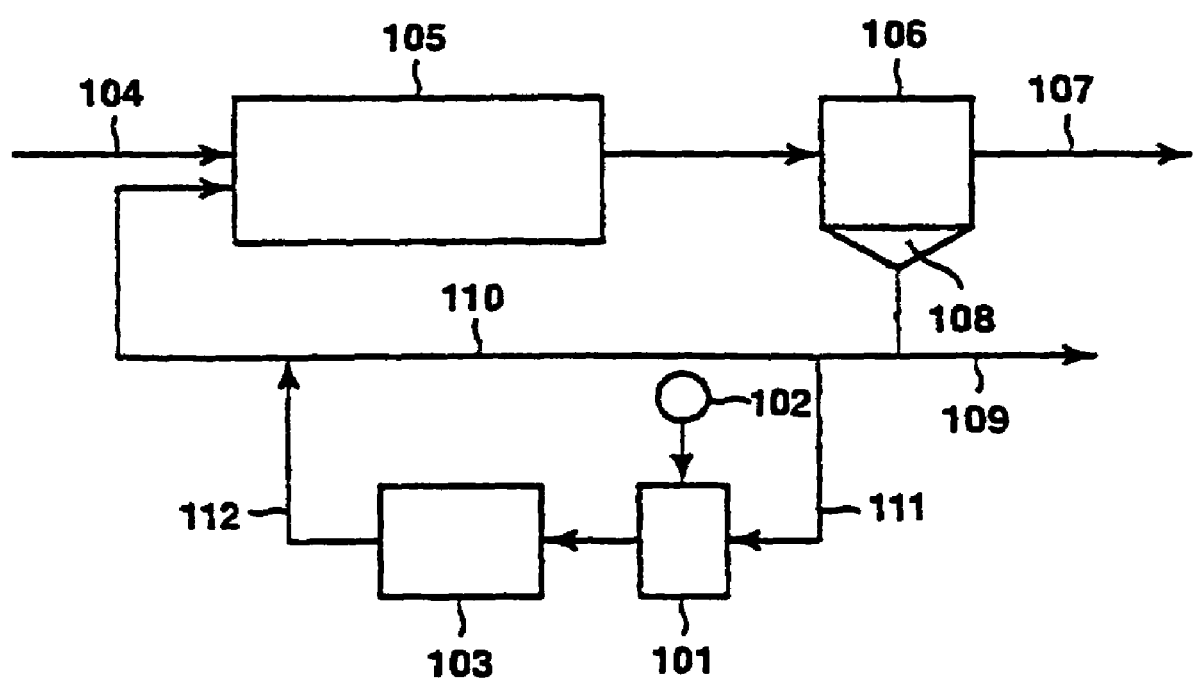
FIG. 9 is a block diagram showing outline of the wastewater treatment apparatus according to the Embodiment 2 of the present invention.

A method for treating wastewater and an apparatus for treating the same by making use of the above-mentioned method for the sludge, are described as follows, referring to the drawing. FIG. 9 shows an example of wastewater treatment apparatus according to the Embodiment 2.

One example of the apparatus for treating wastewater is shown in FIG. 9.

The apparatus for treating the wastewater has a biological treatment tank 105, a precipitating tank 106, an alkali-treatment tank 101, and a biological solubilization tank 103. The wastewater is brought from the source of wastewater (not shown). And, the wastewater is introduced into the biological treatment tank 105, by way of a line 104. The wastewater is subjected to biological treatment in the biological treatment tank 105 for a predetermined period, then is transported into a precipitating tank 106. The wastewater has the characteristics of an organic one. The precipitating tank 106 separates sludge from liquid to be clear treated wastewater. The treated wastewater is discharged from the precipitating tank 106 via a passage 107. As the biological treatment process of the embodiment, activated sludge process, rotary biological contacts process, percolation filter-bed process and submerged biofilter-bed process. However, the biological treatment process is not limited into the above-given ones. Most part of the precipitated sludge 108 after the solid-liquid separation treatment is recycled into the biological treatment tank 105 from a sludge return passage 110. On the other hand, the sludge 111, which has been withdrawn from the sludge return line 110, is introduced into the alkali-treatment tank 101 of the solubilization sludge device. The solubilization sludge device is described in FIG. 1 of the Embodiment 1, where the sludge 111 is treated as described before.

In the solubilizing sludge device, the sludge 112, which has been treated to be solubilized in the alkali-treatment tank 101 and in the biological solubilization tank 103, is returned back trough the return passage 110. And then, the sludge is introduced into the biological treatment tank 105, again, for recycling and treating again biologically. As a result of this procedure, the organic in the sludge, which was solubilized, are removed by decomposing aerobically and biologically, and by converting to inorganic in the biological treatment tank 105. Thus, the discharged amount of excess sludge from the precipitating tank 106 via a passage 109 decreases remarkably.

The Embodiment 2, referring to examples, are described in detail, below. However, the Embodiment is not limited to these examples.

Example 4

Treating excess sludge continuously is explained below, which is related to Embodiment 2, in accordance with FIG. 10.

Figure 10:
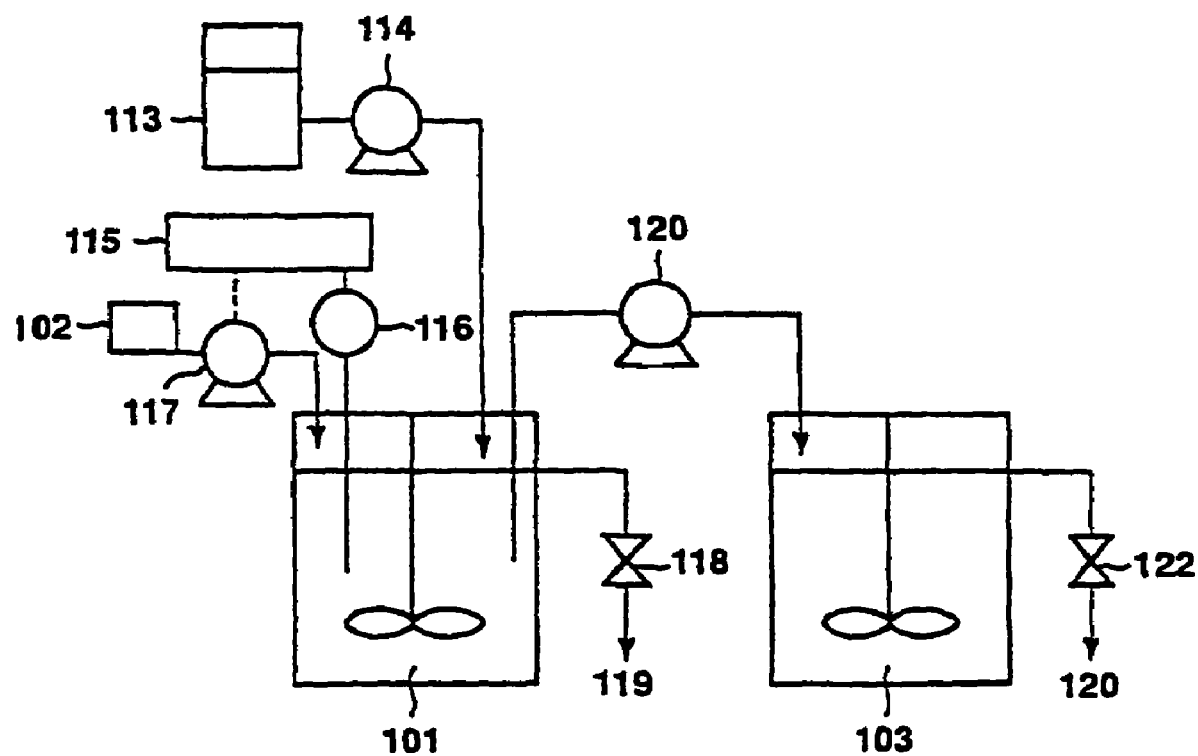
FIG. 10 is an outline of an apparatus used in continuous treatment testing according to the Embodiment 2 of the present invention.

FIG. 10 shows a continuous treatment device used in the continuous treatment test. The continuous treatment device has the cylindrical alkali-treatment tank 101, which has a capacity of 40 ml, and the biological solubilization tank 103, which has the same capacity. Both of the alkali-treatment tank 101 and the biological solubilization tank 103 are kept to be sealed and packed at the normal temperature and pressure, and are agitated merely by mechanical agitator, without using aeration. The testing sludge was excess sludge extracted from a sewage treatment plant, which was stored in an excess sludge tank 113, while adjusting the MLSS to approximately 20 g/L at 4° C. The sludge was successively introduced into the alkali-treatment tank 101 by a sludge transfer pump 114 at a predetermined interval, so as the retention time of the sludge are held to be 6 hours.

Sodium hydroxide (4% concentration) stored in an alkali storage device 102 as the alkali was introduced into the alkali-treatment tank 101 by an alkali transfer pump 117 by a predetermined amount once every 24 hours. The every added amount of alkali was determined to be the same amount of the added sodium hydroxide as the amount of a period of 24 hours under the condition that the pH value detected by a pH sensor 116 was kept to be 8.5 by a pH controller 115. That is to say, the consumed amount of alkali during treating the alkali by the pH control is arranged to be the same amount as the added amount of alkali per unit amount of dry sludge. The retention time (HRT) in the alkali-treatment tank 101 was held to be for 6 hours.

Partial treated sludge was withdrawn from the alkali-treatment tank 101 by using a sludge transfer pump 120, in order to introduce to the biological solubilization tank 103. On the contrary, the other rested part of the treated sludge was overflowed to be discharged from the alkali-treatment tank 101, using an alkali-treatment tank solenoid valve 118.

In the biological solubilization tank 103, solubilization was treated, by using the sludge-solubilized bacteria, for 3 days duration as the retention time (HRT). In the same way within the alkali-treatment tank 101, the biological solubilization tank 103 was kept and controlled to be an adequate water level, by way of overflowing the sludge from the alkali-treatment tank, making use of using a solenoid valve, located in the biological solubilization tank 121.

Figure 11:
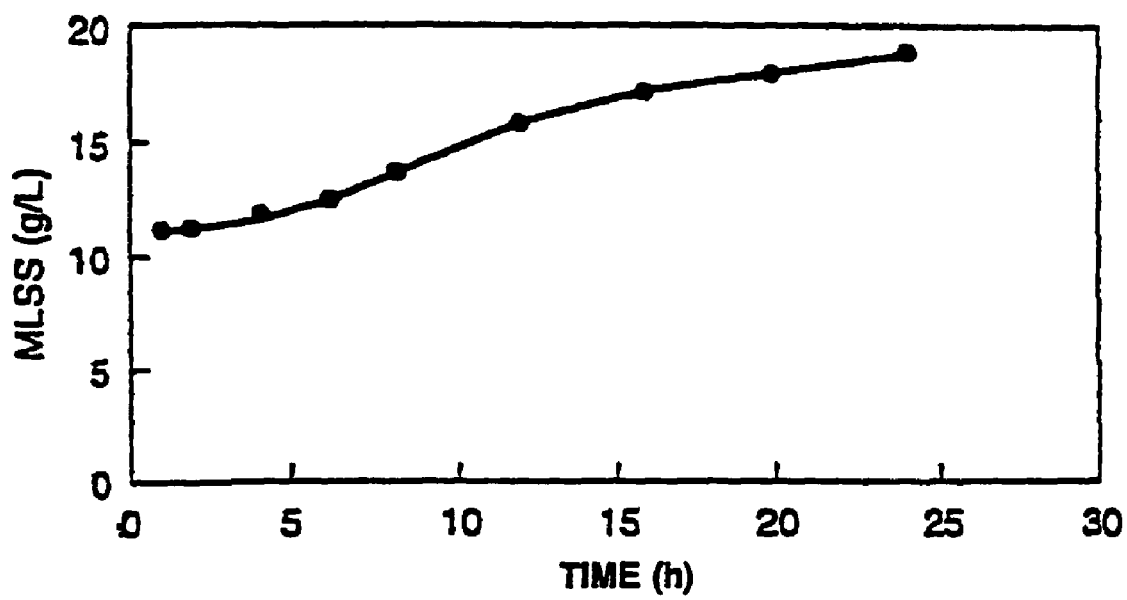
FIG. 11 is a characteristic curve showing the change in MLSS with time during alkali-treatment according to the Embodiment 2 of the present invention.
Figure 12:
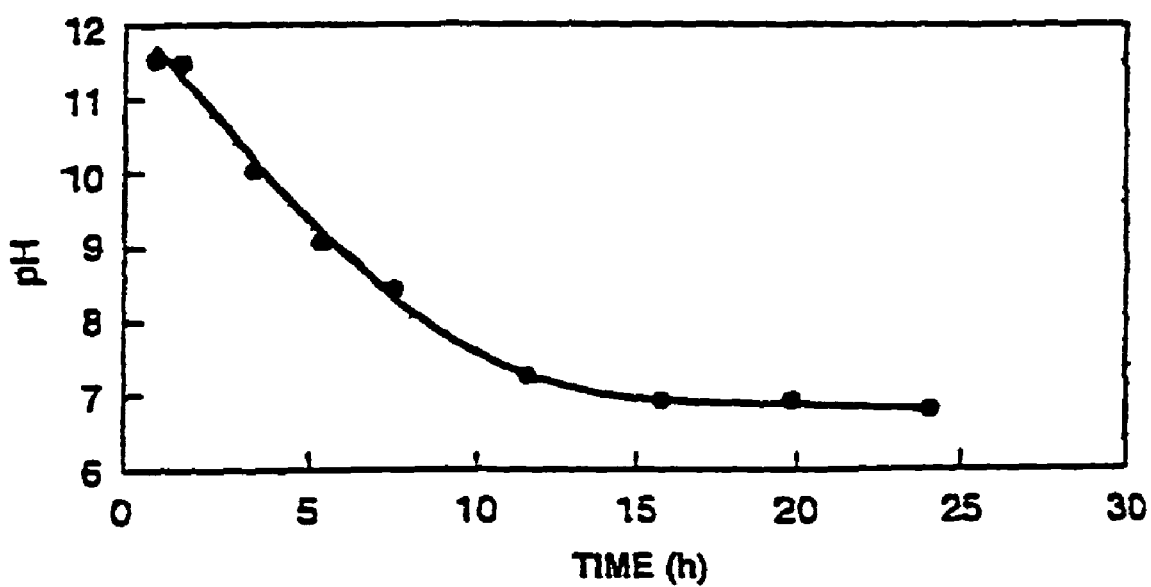
FIG. 12 is a characteristic curve showing the change in pH with time during alkali-treatment according to the Embodiment 2 of the present invention.

The MLSS of effluent sludge 119, which has been overflowed from the alkali-treatment tank 101, varies as the time passes, and depends on the passing time. By that reason, the sludge was extracted at a regular interval to determine the MLSS. Simultaneously with the above-mentioned extraction, the value of pH was measured. The results are shown in FIG. 11 and FIG. 12. The vertical axis of FIG. 11 is MLSS (g/L), and the horizontal axis thereof is time (hour). The vertical axis of FIG. 12 is pH value, and the horizontal axis thereof is time (hour).

After a single cycle (24 hours) of alkali-treatment was completed. MLSS values were plotted to derive formula, then were integrated and averaged. By comparing the averaged MLSS value with the MLSS of testing sample, the percentage of the solubilized sludge in the alkali-treatment tank 101 was calculated. The result is given in Table 5.

The MLSS of effluent sludge 122, which had been overflowed from the biological solubilization tank 103, was compared with the MLSS of effluent sludge 119. And, the percentage of the solubilized sludge in the biological solubilization tank was determined. By comparing the result with the MLSS of the testing sludge, the percentage of the solubilized sludge as the total system was determined. The result is also given in Table 5.

Comparative Example 1

The MLSS of testing sludge was adjusted to approximately 40 g/L. Sodium hydroxide was added to the sludge so that the pH detected by a pH sensor 116 in the alkali-treatment tank 101 can be to be kept on 8.5 by a pH controller 115. Other conditions were the same with those in the Example. Thus, the testing sludge was continuously treated.

Similar with the Example 4, the MLSS of the effluent sludge 119 was compared with the MLSS of the testing sludge 113, the percentage of solubilized sludge in the alkali-treatment tank 101 was calculated. By comparing the MLSS of the effluent sludge 122 with the MLSS of the effluent sludge 119, the percentage of solubilized sludge in the biological solubilization tank was determined. Also, by comparing with the MLSS of the testing sludge 113, the percentage of the solubilized sludge in the total system was determined. The results are also given to Table 5.

Comparative Example 2

Continuous treatment was achieved as the same as the Comparative Example 1 was given below, except that the MLSS of testing sludge was adjusted to about 20 g/L. And then, each solubilized percentage of the sludge was determined. The result is given also in Table 5.

Example 4 shows adding alkali intermittently. In the Example, the solubilization percentage value of 22.8% for alkali-treatment and the solubilization percentage value of 10.1% for microorganisms treatment are added, to summarize the total solubulized percentage value of the sludge 32.

Furthermore, as shown in FIG. 11 and FIG. 12, the pH value in the initial stage of adding alkali was 11 or more. And MLSS in that stage was approximately 11 g/L. At this time, the solubilization percentage reached to approximately 50%. After that, MLSS gradually increased, while pH reduced to the neighborhood point of neutral. And then, at the time of 12 hours later, MLSS arrived at the pH value 7. The phenomena proved that adding alkali intermittently suppresses the excessive consumed alkali, owing to the concentrated progress of solubilization immediately after adding alkali, which results in obtain the high solubilization percentage, totally.

The Comparative Example 1, which adopted approximately 40 g/L of MLSS for the testing sludge, gave 21.5% of alkali-treatment solubilization percentage, 10.9% of microorganisms treatment solubilization percentage, to be summarized as the total value, which means, 32.4% of solubilization percentage of the sludge.

On the other hand, the Comparative Example 2 adopted approximately 20 g/L of MLSS for the testing sludge. In this case, the solubilization percentage in the alkali-treatment was reduced to the degree of 14.6%, the solubilization percentage in the microorganisms treatment reduced to the degree of 6.2%, to be summarized as the total reduced value, 20.8%. The reason why such a reduction can be obtained is thought presumably, as follows. That's to say; the lower concentration value of the treated sludge is, the higher the consumed amount of alkali, which is used for canceling the buffer action of sludge in the alkali-treatment tank. Consequently, it fails to solubilize the sludge sufficiently and to improve efficiently the sludge.

By comparing the Example 4 with the Comparative Examples 1 and 2, it was confirmed that treating the sludge by intermittent addition of alkali invites an efficient process for reducing the volume of the sludge. From another aspect of view, it attains a stable and efficient solubilizing percentage of the sludge, independent of the sludge concentration value.

As described above, the Embodiment 2 provides a method for treating a sludge, which is not influenced by the sludge concentration and, which in a stable way and efficiently, solubilizes the sludge by adding intermittently into the alkali-treatment tank. And the Embodiment provides a method for treating wastewater, which makes use of the method for treating sludge, in order to reduce the generated amount of sludge remarkably. Furthermore, the Embodiment 2 provides an apparatus for treating sludge. In the apparatus, the sludge is efficiently solubilized. And, the apparatus for treating wastewater makes use of the apparatus for treating the sludge, invite the reduction of the generated amount of the sludge, to a great extent.

Since the Embodiment obtains an efficient solubilization method for the sludge, which is independent of the sludge concentration. The method and the apparatus enable us to create a realistic process for solubilizing the sludge, from both viewpoints of the running cost and the stability in treating. When the sludge solubilized in such a way is recycled to the biological treatment system, the generated amount of the excess sludge can be minimized. This embodiment makes it unnecessary to maintain the conventional sludge dewatering step, the sludge incineration step, and the like, or else, which can also, minimize the facility scale of these steps. The Embodiment is extremely effective for treating the sludge

TABLE 5

| Example/Comparative Example | Sludge concentration (g/L) | Method of alkali addition | Added alkali (g-NaOH/g-sludge) | Solubilization percentage | | |
|---|---|---|---|---|---|---|
| | | | | Alkali-treatment tank | Biological solubilization tank | Total |
| Example 1 | 20 | Intermittent addition at every 24 hours | 0.052 | 22.8 | 10.1 | 32.9 |
| Comparative Example 1 | 40 | pH (8.5) continuous control | 0.052 | 21.5 | 10.9 | 32.4 |
| Comparative Example 2 | 20 | pH (8.5) continuous control | 0.052 | 14.6 | 6.2 | 20.8 | generated from the biological treatment process for wastewater such as sewage. Therefore, the Embodiment brings the society a lot of the industrial value.

As described in detail above, the Embodiment provides a treating method for solubilizing sludge, which solubilizes the sludge generated from an biological treatment process of wastewater, at high efficiency and at lower running cost, and an apparatus thereof. The embodiment, furthermore, provides a method for treating wastewater, in which, by utilizing the sludge treatment method and apparatus to significantly reduce the generated amount of the sludge, and an apparatus thereof.

Embodiment 3

Figure 13:
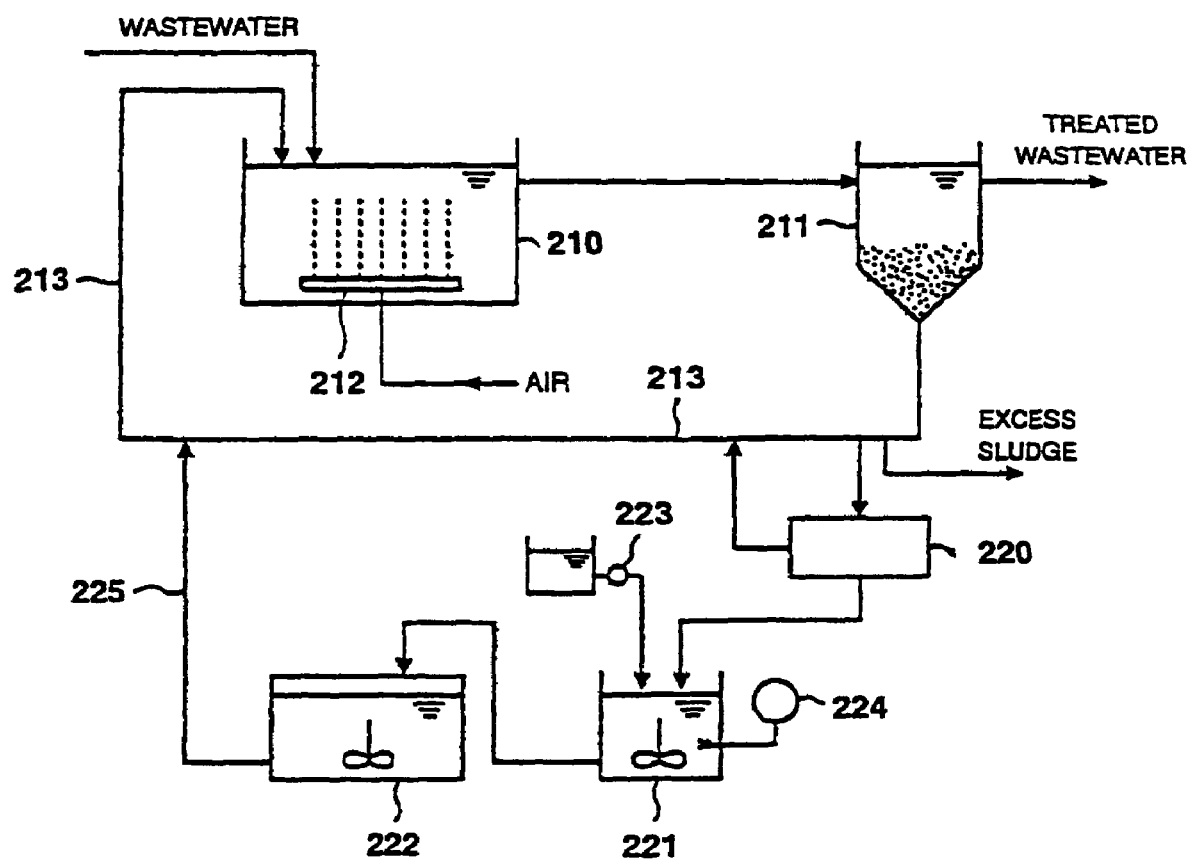
FIG. 13 shows an example of an embodiment according to the Embodiment 3 of the present invention.

FIG. 13 shows an example of the Embodiment 3. The wastewater treatment device comprises a wastewater treatment system and a sludge treatment system. The wastewater treatment system has an aeration tank 210, which is an biological treatment tank to treat wastewater under an aerobic condition, and a solid-liquid separator 211, which receives the wastewater from the aeration tank 210 to precipitate the sludge, thus separating the treated wastewater and the returned sludge. The aeration tank 210 has a diffuser 212 for blowing fine air bubbles into the aeration tank. A returned sludge passage 213 is prepared to recycle the sludge to the aeration tank 210, where the sludge has been obtained by solid-liquid separation treatment.

The sludge treatment system has a sludge-thickening unit 220. This system concentrates the sludge discharged from the solid-liquid separator 211, an alkali-treatment tank 221, which applies alkali-treatment to the concentrated sludge discharged from the sludge thickening unit 220 by adding alkali thereto. And this system has a solubilization tank 222, which applies biological treatment to the sludge discharged from the alkali-treatment tank 221 in order to solubilize and in order to decompose in the tanks. The solubilization tank 222 is kept in an anaerobic, anoxic, or microaerophilic condition by agitating mildly. The system has an alkali-feed unit 223, a pH meter 224, and a solubilized sludge returned passage 225, which recycles the solubilized sludge to the aeration tank 210.

The apparatus according to the Embodiment is not limited to the device configuration shown in FIG. 13. For example, the wastewater treatment system adopts the aeration tank 210, such as the biological treatment tank, which is assuming the activated sludge process. For instance, not only the activated sludge process but several devices may be applied to, which are, wastewater treatment using oxidation ditch process, rotary biological contact process, percolation filter-bed process, submerged biofilter-bed process, or the like.

Preferable alkali, which is fed to the alkali-treatment tank 221, is the alkali, whose characteristic has high solubility, such as sodium hydroxide, potassium hydroxide, and sodium carbonate.

Treating the wastewater, which is achieved by the above-mentioned configuration of devices, is carried out, as follows. Wastewater after removing a large size of solid and sand, which have comparatively high specific gravity, is introduced into the aeration tank 210. And then, the wastewater is subjected to biological treatment. Simultaneously with this treatment, a great deal of amount of returned sludge is introduced into the aeration tank 210 via the returned sludge passage 213. The wastewater after being treated biologically becomes clean. And, the clean wastewater is fed into the solid-liquid separator 211, altogether with the sludge. In the solid-liquid separator 211, two sorts of layers are formed. One is supernatant layer, the other is sludge layer. The supernatant is discharged as the treated wastewater. On the other hand, the precipitated sludge is recycled to the aeration tank 210 via the returned sludge passage 213.

In regard with the returned sludge, some parts of the returned sludge are withdrawn from the returned sludge passage 213 to enter the sludge thickening unit 220, where the sludge is concentrated. The concentrated sludge is fed into the alkali-treatment tank 221. An alkali is added from the alkali feed unit 223 to the alkali-treatment tank 221 in order to adjust the pH within the range from 9 to 12.5, preferably within the range from 9.5 to 11. The alkali-added sludge undergoes the alkali-treatment for approximately from 3 to 24 hours with agitating. Through the alkali-treatment, the components of the sludge is destroyed to become soluble substances.

The sludge discharged from the alkali-treatment tank 221 is fed into the solubilization tank 222, where the sludge is kept under the condition of an anaerobic, anoxic, or microaerophilic for approximately for from 1 to 3 days. During treating in the solubilization tank 222, the soluble substances generated in the alkali-treatment tank 221 are further decomposed by the biological treatment. As the result of it, the treated substances become to have low molecular weight chemical compounds, such as organic acids. Consequently, the pH value usually reduces to the degree of from 7 to 8.

The sludge discharged from the solubilization tank 222 is recycled into the aeration tank 210, via the solubilized sludge returned passage 225. In the aeration tank 210, where the solubilized sludge is recycled back and entered into, the BOD components in the entered wastewater are decomposed, and the BOD components in the solubilized sludge, which has been reduced in the molecular weight, are also decomposed. At that time, if high molecular weight substances (i.e. substances difficult to decompose) exist in the solubilized sludge, these substances are discharged, together with the treated wastewater without being decomposed, which will result in degrading the quality of the treated wastewater. However, if, treating sludge is achieved under the above-given conditions, the molecular weight of sludge is fully kept on reducing. And most of the components in the solubilized sludge are completely decomposed to another substances, which is, carbon dioxide and water (and nitrogen, in case of treating denitrification). By that reason, the amount of solubilized sludge components, which has been discharged together with the treated wastewater, reduces remarkably. In the end, such a reduction suppresses the degraded degree of the quality, which is related to the treated wastewater.

As described above, the sufficient solubilization and decomposition invite the sludge treatment system the result that almost of no excess sludge is generated, or else, there generates just the least amount. In addition, decomposing BOD components is enhanced in the wastewater treatment system, so, the quality of the treated wastewater is improved to a big deal, compared with the conventional technology, which concerns with the way to reduce the volume of the sludge.

Example 5

A wastewater treatment device, which has a similar configuration with FIG. 13, was made use of for treating the sewage, which was extracted from a sewage treatment facility. The temperature of the treated wastewater was fallen within a range from 20° C. to 25° C. Flow SS was within a range from 90 to 110 mg/L and BOD was within a range from 150 to 185 mg/L. The alkali-treatment tank and the solubilization tank had a sealed structure. In this case, the sludge was just agitated mechanically, without any of aeration.

(Condition of the Wastewater Treatment System)

The amount of the returned sludge: 0.5 times as much as the amount of the treated wastewater.

(Conditions of the Sludge Treatment System)

Condition for Treating in the Alkali-Treatment Tank
the withdrawn amount of the sludge: one fifth of the amount of the returned sludge.
Alkali agent used: NaOH
the determined pH value: 9.3, 10.5
Retention time: for 6 hours
Condition for Treating in the Solubilization Tank
Retention time: for 2.5 days The result, which was achieved under the above-mentioned conditions, is shown in Table 6, as follow.

Comparative Example 3

In the Comparative Example, the same wastewater treatment apparatus was used. In this case, the pH value in the alkali-treatment tank was determined to be lower than value 9. The treatment conditions were as the same as those in the Example, except that the pH value in the alkali-treatment tank is determined to be 8.5. The result is given also in Table 6, together with the results of the examples.

TABLE 6

|  | Comparative Example | Example 1 | Example 2 |
|---|---|---|---|
| pH in alkali-treatment tank | 8.5 | 9.3 | 10.5 |
| Solubilizing sludge percentage (%) | 32.3 | 36.8 | 39.6 |
| s-BOD of solubilized sludge | 485 | 932 | 1960 |
| COD of treated wastewater | 25.4 | 15.2 | 8.5 |
| Ratio of running cost | 1 | 1.12 | 1.32 |

In Table 6, the ratio of the running cost means that the electric cost and the chemicals cost are summarized totally in the Examples, and that the each ratio in the Examples is based on the basis of the cost of the Comparative Example as unity, whose value is 1. The reason why the running costs increase in the Examples depends on the rising of the aeration power, which has resulted by the increase in the aeration tank load. In this case, the rising of the amount of the consumed chemicals cost (alkali, etc) causes the rising of the aeration power.

Table 6 shows that the percentage of the solubilized sludge rate increases from the value of more than pH 9 in the alkali-treatment tank. From more than pH 9, the increasing degree of the solubilizing ratio becomes higher, depending on the increasing degree of pH value. Simultaneously with the increasing of solubilizing ratio, the value of the soluble BOD rises in the solubilized sludge, and the value of the COD descends in the treated wastewater. Accordingly, it is important that the generated amount of the excess sludge is suppressed, and it is important that the quality of the treated wastewater is improved to be closer at the quality of the treated wastewater, which has been discharged from a wastewater treatment device. (Note: In this case, the waste treatment device has no sludge treatment system for solubilizing the sludge). In order to achieve the above-mentioned objects, the pH value in the alkali-treatment tank is required to be kept to the degree of more than value 9.

According to the Embodiment, the generated amount of the excess sludge reduces. And, the quality of the treated wastewater is improved. As the result of it, the quality of the treated wastewater can approach much closer to the quality of the treated wastewater discharged from a wastewater treatment device, which has no sludge treatment system.

What is claimed is:

1. A method for treating a wastewater comprising:
   (a) treating a wastewater biologically in a biological treatment tank;
   (b) separating a solid from a liquid in the wastewater treated biologically from step (a), to obtain a treated wastewater and a sludge;
   (c) withdrawing a portion of the sludge from step (b) to obtain a withdrawn sludge;
   (d) treating the withdrawn sludge from step (c) by an alkali-treatment to reduce the volume of the sludge;
   (e) biologically solubilizing and decomposing the withdrawn sludge from step (d), under an anaerobic, an anoxic or a microaerophilic condition and in the presence of a sludge decomposing microorganism to produce a solubilized sludge; and
   (f) returning the solubilized sludge from step (e) to the biological treatment tank of step (a).

2. The method according to claim 1, wherein in step (d), withdrawn sludge from step (c) is treated by an alkali-treatment at a pH value of 7 to less than 9 and for a retention time of 3 hours to 24 hours; and in step (e), the solubilizing comprises solubilizing the withdrawn sludge from step (d), at a temperature of 5° C. to 35° C., at atmospheric pressure and for a retention time of 1 day to 3 days.

3. The method according to claim 1, further comprising the step of thickening the sludge before treating the withdrawn sludge by the alkali-treatment.

4. The method according to claim 1, wherein step (e) is carried out under an anaerobic condition.

5. A method for treating a sludge comprising:
   (a) biologically treating a wastewater to generate the sludge; and
   (b) treating the sludge from step (a) by an alkali-treatment, by intermittently adding an alkali to the sludge at an interval of 0.5 hours to 48 hours.

6. The method according to claim 5, further comprising a step of biologically solubilizing a sludge after treating the sludge by the alkali-treatment under an anaerobic, an anoxic or a microaerophilic condition.

7. The method according to claim 6, wherein the alkali-treatment is carried out at a temperature of 5° C. to 35° C. and at atmospheric pressure; and the solubilizing of the sludge is carried out at a temperature of 5° C. to 35° C. and at atmospheric pressure.

8. The method according to claim 6, wherein a retention time of the sludge in the alkali-treatment step (c) is 3 hours to 24 hours and a retention time of the sludge in the biological solubilization step (d) is 1 day to 3 days.

9. The method according to claim 6, wherein step (b) is carried out under a microaerophilic condition.

10. A method for treating a sludge comprising:
    (a) biologically treating a wastewater to generate the sludge; and
    (b) treating the sludge from step (a) by an alkali-treatment, by intermittently adding the alkali to the sludge at a determined interval,
    wherein a retention time of the sludge in the alkali-treatment step (b) is 3 hours to 24 hours and a retention time of the sludge in the biological solubilization step (a) is 1 day to 3 days.

11. A method for treating a sludge comprising:
    (a) biologically treating a wastewater to generate the sludge; and (b) treating the sludge from step (a) by an alkali-treatment, by intermittently adding the alkali to the sludge at a determined interval, wherein a retention time of the sludge in the alkali-treatment step (b) is 3 hours to 24 hours and a retention time of the sludge in the biological solubilization step (a) is 1 day to 3 days, and wherein the alkali-treatment is carried out at a temperature of 5° C. to 35° C. and at atmospheric pressure; and the solubilizing of the sludge is carried out at a temperature of 5° C. to 35° C. and at atmospheric pressure.

12. A triethod for treating a wastewater comprising:
(a) biologically treating a wastewater in a biological treatment system;
(b) separating a solid from a liquid after treating the wastewater biologically, to obtain a treated wastewater and a sludge, and to obtain a withdrawn sludge from a part of the sludge;
(c) treating the withdrawn sludge from step (b) in an alkali-treatment to obtain an alkali-treated sludge, by intermittently adding an alkali at a determined interval, wherein a retention time after adding the alkali is 3 hours to 24 hours;
(d) biologically solubilizing the alkali-treated sludge from step (c) at a temperature of 5° C. to 35° C. and at atmospheric pressure in an anaerobic, an anoxic, or a microaerophilic atmosphere, wherein a retention time after adding the alkali is 1 day to 3 days, to obtain a solubilized sludge; and
(e) recycling the solubilized sludge from step (d) to the biological treatment system of step (a).

13. A method for treating a wastewater comprising:
(a) biologically treating a wastewater in a biological treatment tank to obtain a biologically treated wastewater;
(b) separating a solid from a liquid in the biologically treated wastewater from step (a) to obtain a treated wastewater and a sludge;
(c) treating a part of the sludge from step (b) by an alkali-treatment, within a pH range of 9 to 12.5 to reduce the volume of the part of the sludge;
(d) biologically solubilizing the sludge from step (c) in an anaerobic, an anoxic or a microaerophilic condition and in the presence of a sludge decomposing microorganism to reduce the volume of the sludge to obtain a solubilized sludge; and
(e) returning the solubilized sludge from step (d) to the biological treatment tank of step (a).

14. The method according to claim 13, further comprising a step of thickening the sludge before treating the sludge by the alkali-treatment.

15. The method according to claim 13, wherein a retention time of the sludge in the alkali-treatment step (c) is 3 hours to 24 hours and a retention time of the sludge in the biological solubilization step (d) is 1 day to 3 days.

* * * * *